United States Patent [19]

Peter

[11] Patent Number: 4,566,407
[45] Date of Patent: Jan. 28, 1986

[54] COOLING ARRANGEMENT FOR AN AUTOMOTIVE VEHICLE, ESPECIALLY A PASSENGER CAR

[75] Inventor: Dietmar Peter, Hemmingen, Fed. Rep. of Germany

[73] Assignee: Dr. Ing. h.c.F. Porsche Aktiengesellschaft, Fed. Rep. of Germany

[21] Appl. No.: 661,568

[22] Filed: Oct. 16, 1984

[30] Foreign Application Priority Data

Oct. 22, 1983 [DE] Fed. Rep. of Germany ....... 3338466

[51] Int. Cl.⁴ ................................................ F01P 3/18
[52] U.S. Cl. .................................. 123/41.48; 165/51; 180/68.4
[58] Field of Search ............... 123/41.01, 41.04, 41.05, 123/41.06, 41.31, 41.48, 41.51; 180/68.1, 68.4, 68.6; 165/51

[56] References Cited

U.S. PATENT DOCUMENTS

| | | | |
|---|---|---|---|
| 1,867,678 | 7/1932 | Rayburn | 74/710 |
| 2,095,058 | 10/1937 | Cross | 123/41.51 |
| 3,933,136 | 1/1976 | Burst | 180/68.1 |
| 3,976,041 | 8/1976 | Mettig et al. | 123/41.31 |

*Primary Examiner*—William A. Cuchlinski, Jr.
*Attorney, Agent, or Firm*—Barnes & Thornburg

[57] ABSTRACT

An automotive vehicle, especially a passenger car, comprises a bumper, at least two radiators and an air duct system for guiding the cooling air stream over the radiators. To provide a cooling air guidance system which is simple in construction, which functions satisfactorily, and which can be integrated into the vehicle with few problems, each radiator is provided with a separate air duct. The inlet ports and/or the air guide means are arranged in an elastic cover of the bumper which forms the end portion of the vehicle. At least one inlet port and one air duct extend, in part through a rigid support of the bumper. The inlet port is located in a zone of maximum dynamic pressure, namely underneath a nose-like projection of the cover.

28 Claims, 4 Drawing Figures

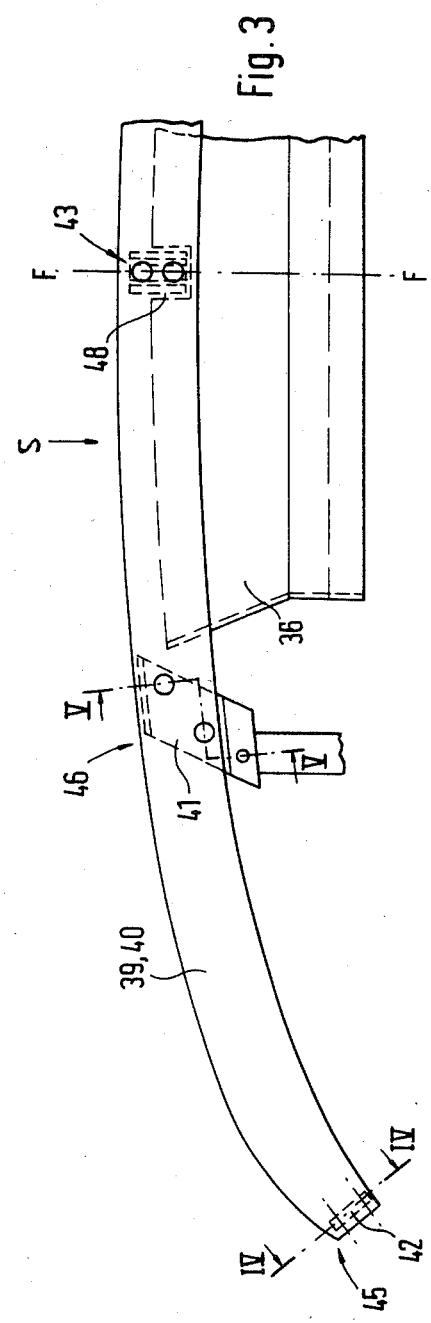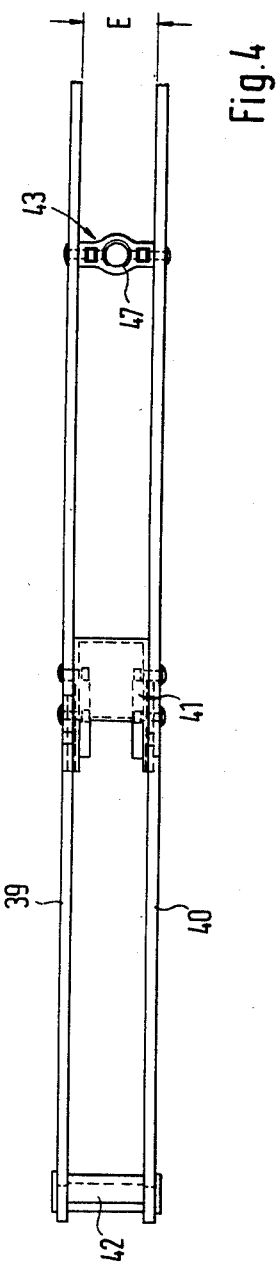

COOLING ARRANGEMENT FOR AN AUTOMOTIVE VEHICLE, ESPECIALLY A PASSENGER CAR

BACKGROUND AND SUMMARY OF THE INVENTION

This invention relates to an automotive vehicle, especially a passenger car, having a bumper, at least two radiators, and an air duct for guiding the cooling air stream over the radiators. The air duct has an inlet port provided with air directing means.

German Unexamined Published Patent Application 2,306,317 shows an automotive vehicle which has two series-arranged radiators extending transversely to the driving direction. A common air duct is associated with the two radiators. The air duct includes two walls forming a tunnel and air directing means provided between the walls in the area of the cooling air inlet port. The air directing means is formed from a separately manufactured synthetic resin component.

A disadvantage of this arrangement is that the radiators, disposed in a common duct, are not exposed to an adequately defined throughflow of cooling air, as is required, for example, for a supercharger air cooler and an engine radiator.

Moreover, this air duct must be large in cross-sectional area to accomodate the necessary air flow for the radiators, since the cooling air inlet port is located in an area of relatively low dynamic pressure. Furthermore, design freedom in the front end space is impaired by the large-area structure of the air duct. Another drawback is that the air duct, which consists of several parts, is relatively expensive to manufacture and assemble.

It is an object of this invention to provide, for an automotive vehicle having at least two radiators, a cooling air guide system which is simple in construction, which functions satisfactorily, and which can be integrated into the vehicle with few problems.

These objects are attained in a cooling air guidance system which comprises a separate air duct for each radiator. Each air duct has an inlet port provided with means for directing the cooling air flow. The inlet ports and the air directing means are arranged in an elastic cover of the bumper. One of the air ducts extends, in part, through an opening in a rigid support member for the bumper. To increase cooling efficiency, at least one of the inlet ports is located in an area of maximum dynamic pressure, e.g., below a nose-shaped projection of the bumper cover.

The two radiators and their respective air ducts are preferably arranged in upper and lower vertical relation. Each air duct is formed by an air guide housing, detachably connected to the radiator and the inlet port. The housings are preferably made of a synthetic resin by a blow-molding technique.

The lower inlet port is formed by a plurality of vertically spaced slotted openings which extend transversely to the vehicle. Ribs in the bumper cover extend between the slotted openings and serve as means for directing the cooling air stream.

The bumper is supported by a rigid support member which is open, relative to the longitudinal axis of the vehicle, and which is situated directly behind the upper inlet port. The support member forms a portion of the upper air duct. The support is formed by two generally horizontal plate members, spaced vertically a distance from each other. The panels are held in position by locally arranged holders and spacer elements. The panels are fastened to the holders and spacers by fasteners, such as screws, rivets and the like.

The primary advantage attained by the invention is improved cooling as a result of providing each radiator with its own air duct. By locating the inlet ports in an area of maximum dynamic pressure, an increased air flow rate is attained with a smaller air duct cross section. This allows for reductions in the cross section of the air duct and the dimensions of the radiators. The inlet ports can also be made substantially smaller in size if they are located in an area of high, rather than low, dynamic pressure. Since the bumper (support and cover) is utilized for forming the cooling air guide system, the space available at that location is more effectively used.

By arranging the inlet ports and the air directing means in the elastic cover of the bumper and by manufacturing the air guide housings of a synthetic resin by a blow-molding method, a simple and economically producible cooling air guide system is created which can be mounted in a rapid and simple fashion. The bumper support, which consists of two panels with associated holder and spacer elements, is simple in construction and can be inexpensively manufactured.

Other objects, advantages and novel features of the present invention will become apparent from the following detailed description of the invention when considered in conjunction with the accompanying drawings.

BRIEF DESCRIPTION OF THE DRAWINGS

FIG. 3 is a view in the direction of arrow R in FIG. 2, without the elastic cover of the bumper, and without the two radiators, FIG. 4 is a view in the direction of arrow S in FIG. 3, showing the bumper support.

DETAILED DESCRIPTION OF THE DRAWINGS

Figure 1:
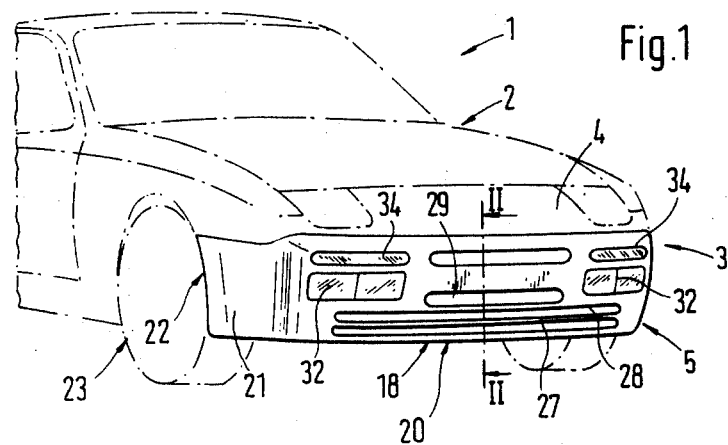
FIG. 1 is an oblique view from the front showing the front end of a passenger car.
Figure 2:
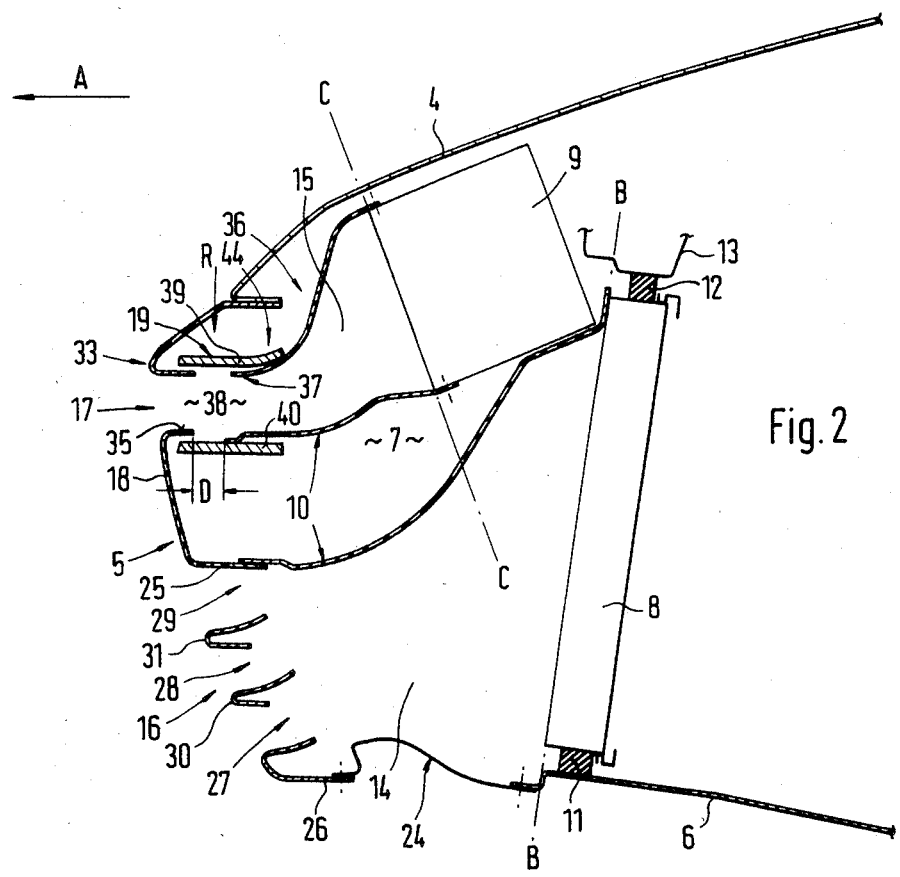
FIG. 2 is a section along line II—II of FIG. 1.

FIGS. 1 and 2 show the front end portion of a passenger car 1, which comprises a fixed body 2 having an end zone 3 defined by an upper body wall 4, a bumper 5, and a lower boundary wall 6.

Two radiators 8 and 9 are arranged behind bumper 5 (as viewed with respect to the driving direction A) in a space 7 which extends between upper body wall 4 and lower boundary wall 6. An arrangement generally indicated by reference numeral 10 is provided for guiding the cooling air stream which acts on radiators 8 and 9. The two radiators 8 and 9 extend substantially transversely to the driving direction A and are arranged in upper and lower relation, as shown in FIG. 2. However, it is also possible to position the two radiators 8 and 9 side-by-side (not shown in the drawings).

The radiator 8, associated with the cooling water circulation system of an internal combustion engine (not shown), is inclined in the automotive vehicle such that its plane of inclination B—B extends, relative to the driving direction A, obliquely from the top toward the bottom. Radiator 8 is held in position by elastic bearings 11 and 12 mounted on lower boundary wall 6 and an upper transverse support 13 of body 2, respectively.

Radiator 9 (depicted in this embodiment as a supercharger air cooler) is positioned above radiator 8 and is inclined such that its plane of inclination C—C extends away from the driving direction A obliquely from the top toward the bottom. As shown in FIG. 2, radiator 9 is located in front of radiator 8, relative to the driving direction A.

The arrangement 10 for conducting the cooling air stream which acts on radiators 8 and 9 comprises, for each radiator 8 and 9, a separate air duct 14 and 15 fashioned in the manner of a tunnel. Both air ducts 14 and 15 are provided with respective inlet ports 16 and 17. Inlet ports 16 and 17 are arranged in an elastic cover 18 forming end zone 3 of the vehicle. Cover 18 is a structural part of bumper 5 and shrouds a rigid support 19 of bumper 5.

Cover 18, which consists of a suitable synthetic resin (for example polyurethane foam or glass-fiber-reinforced polyurethane foam), has a central section 20, extending transversely to the driving direction A, and two outwardly located, longitudinally oriented sections 21. The free ends 22 of sections 21 extend up and to the front wheels 23 and there form, in part, the wheel cutouts (FIG. 1).

Air duct 14, located on the bottom, extends from inlet port 16 in cover 18 to radiator 8 and is formed by a first air guide housing 24, detachably connected to webs 25 and 26 of cover 18, and bounded by radiator 8 and inlet port 16.

Inlet port 16 consists of several vertically arranged slotted openings 27, 28 and 29. Ribs 30 and 31 of cover 18 extend between the slotted openings 27, 28 and 29. Ribs 30 and 31 are shaped to serve as air directing means for the cooling air stream and effect distribution of the air stream.

As shown in FIG. 1, upper slotted opening 29 is smaller in transverse width, as compared with slotted openings 27 and 28 disposed therebelow, since light units 32 are provided in cover 18 on both sides of slotted openings 29.

Inlet port 17 of air duct 15 is located in an area of maximum dynamic pressure in the automobile front end, namely underneath a projection 33, shaped in the form of a nose, in cover 18 (FIG. 2). Inlet port 17 is bounded laterally by direction indicator light units 34, as shown in FIG. 1.

Air duct 15 is formed, starting from the front and moving away from the driving direction A, by: a formed segment 35 of cover 18 (which constitutes inlet port 17); rigid support 19 of bumper 5 in the area labeled D in FIG. 2; and by a second air guide housing 36 in the area behind the support. The rearward end of this housing is connected to radiator 9.

The formed segment 35 and a forward end 37 of air guide housing 36 extend at least in part into a space 38 of support 19 and are held in that position without additional fastening means, the upper and lower wall sections of air guide housing 36 being locally supported on the insides of support 19.

The two air guide housings 24 and 36 are made to flare funnel-like toward radiators 8 and 9, respectively, and are made preferably of a synthetic resin by a blow-molding technique. As shown in FIG. 2, air guide housings 24 and 36 have rectangularly shaped cross-sections.

Rigid support 19 of bumper 5 is formed of two panels 39 and 40 extending approximately horizontally. These panels are spaced apart in the vertical direction a distance E (FIG. 4). Panels 39 and 40, as viewed from above, are shaped to conform to the contour of end zone 3 and are held in position by means of locally arranged holders 41 or spacer elements 42 and 43. Fastening elements, such as screws, rivets, or the like, are provided for joining panels 39 and 40 to holder 41 and/or spacer elements 42 and 43. As shown in FIG. 2, upper panel 39 is formed in the rearward section with an upwardly oriented bent portion 44 to provide for a continuous enlargement in the throughflow cross section of air duct 15 moving in the direction toward radiator 9.

Spacer elements 42 are located at the outwardly lying ends 45 of panels 39 and 40, and spacer element 43 is located in a longitudinal plane of symmetry F-F of support 19. Holders 41 are arranged in an intermediate region 46 of support 19 and are supported on the ends of structural supports which are not shown in detail.

As shown in FIG. 4, spacer element 43 has a threaded section 47 into which can be threaded a towing eye (not shown). Air guide housing 36 is provided with a recess 48 at certain locations at the top and at the bottom to provide clearance for the spacer element.

However, it is also possible to form rigid support 19 with a U-shaped cross-section having the two legs extending in the horizontal direction and the connecting web extending in the vertical direction. With this arrangement, the connecting web is provided with a perforation in the region of the air duct so that the air guide housing can be attached to the support (not illustrated in the drawings).

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. Automotive vehicle, especially a passenger car, having a bumper, at least two radiators and an air guidance system for guiding a cooling air stream the radiators, said air guidance system comprising:
    a separate air duct for each radiator, each said air duct having an inlet port,
    each said air duct extending from said inlet port to said radiator, and
    each said inlet port having means for directing a flow of cooling air.

2. Automotive vehicle according to claim 1, wherein the inlet ports and the air directing means are arranged in a elastic cover of the bumper.

3. Automotive vehicle according to claim 2, wherein the radiators and the air ducts are arranged in upper and lower relation.

4. Automotive vehicle according to claim 3, wherein the lower air duct is formed by a first air guide housing detachably connected to the lower radiator and to the lower inlet port.

5. Automotive vehicle according to claim 4, wherein the lower inlet port is formed by a plurality of vertically spaced slotted openings extending transversely to the vehicle, and by ribs of the cover extending between the vertically spaced slotted openings, said ribs serving as means for directing the cooling air stream.

6. Automotive vehicle according to claim 4, wherein the air guide housing is made of a synthetic resin by a blow-molding method.

7. Automotive vehicle according to claim 3, wherein a rigid support for the bumper is of open construction, relative to the longitudinal direction of the vehicle, and is arranged directly behind the upper inlet port, said support and a second air guide housing forming the upper air duct.

8. Automotive vehicle according to claim 7, wherein the support is formed from two generally horizontal panels, said panels being vertically spaced a distance (E) from each other.

9. Automotive vehicle according to claim 8, further comprising means for holding the panels in position.

10. Automotive vehicle according to claim 9, wherein said means for holding the panels include locally arranged holder and spacer elements.

11. Automotive vehicle according to claim 10, wherein the panels are connected to the holders and spacer elements by fastener means, such as screws, rivets and the like.

12. Automotive vehicle according to claim 7, wherein a formed segment of the cover forming the upper inlet port and a forward end of the second air guide housing project, at least in part, into the opening of the support.

13. Automotive vehicle according to claim 7, wherein the air guide housing is made of a synthetic resin by a blow-molding method.

14. Automotive vehicle according to claim 1, wherein at least one inlet port and one air duct extend, in part, through a rigid support for the bumper.

15. Automotive vehicle according to claim 1, wherein at least one of said inlet ports is located in an area of maximum dynamic pressure.

16. Automotive vehicle according to claim 15, wherein the area of maximum dynamic pressure is located below a nose-shaped projection of the cover.

17. Automotive vehicle according to claim 1, wherein said inlet port for each air duct is arranged in a front surface of said automotive vehicle.

18. Automotive vehicle, especially a passenger car, having a bumper, at least two radiators and an air guidance system for guiding a cooling air stream to the radiators, said air guidance system comprising a separate air duct for each radiator, each air duct having an inlet port, and each inlet port having means for directing a flow of cooling air, the inlet ports and the air directing means being arranged in an elastic cover of the bumper, the radiators and the air ducts being arranged in upper and lower relation.

19. Automotive vehicle according to claim 18, wherein the lower air duct is formed by a first air guide housing detachably connected to the lower radiator and to the lower inlet port.

20. Automotive vehicle according to claim 19, wherein the lower inlet port is formed by a plurality of vertically spaced slotted openings extending transversely to the vehicle, and by ribs of the cover extending between the laterally spaced slotted openings, said ribs serving as means for directing the cooling air stream.

21. Automotive vehicle according to claim 19, wherein the air guide housing is made of a synthetic resin by a blow-molding method.

22. Automotive vehicle according to claim 18, wherein a rigid support for the bumper is of open construction, relative to the longitudinal direction of the vehicle, and is arranged directly behind the upper inlet port, said support and a second air guide housing forming the upper air duct.

23. Automotive vehicle according to claim 22, wherein the support is formed from two generally horizontal panels, said panels being vertically spaced a distance (E) from each other.

24. Automotive vehicle according to claim 23, further comprising means for holding the panels in position.

25. Automotive vehicle according to claim 24, wherein said means for holding the panels include locally arranged holder and spacer elements.

26. Automotive vehicle according to claim 25, wherein the panels are connected to the holders and and spacer elements by fastener means, such as screws, rivets and the like.

27. Automotive vehicle according to claim 22, wherein a formed segment of the cover forming the upper inlet port and a forward end of the second air guide housing project, at least in part, into the opening of the support.

28. Automotive vehicle according to claim 22, wherein the air guide housing is made of a synthetic resin by a blow-molding method.

* * * * *